United States Patent [19]

Anderson et al.

[11] Patent Number: 5,089,338

[45] Date of Patent: Feb. 18, 1992

[54] SECURITY AEROWRAP

[75] Inventors: Brooke Anderson, Salem; John W. Smith, Sebring, both of Ohio

[73] Assignee: Salem Label Company, Inc., Salem, Ohio

[21] Appl. No.: 583,329

[22] Filed: Sep. 17, 1990

[51] Int. Cl.$^5$ ................................................ B32B 7/12
[52] U.S. Cl. ..................................... 428/354; 428/40; 428/344; 428/201; 156/344
[58] Field of Search ............... 428/40, 354, 344, 41, 428/42

[56] References Cited

U.S. PATENT DOCUMENTS

| | | | |
|---|---|---|---|
| 3,631,617 | 1/1972 | Pekko | 40/2.2 |
| 4,121,003 | 10/1978 | Williams | 428/40 |
| 4,184,701 | 1/1980 | Franklin | 283/9 R |
| 4,837,088 | 6/1989 | Freedman | 428/40 X |
| 4,915,994 | 4/1990 | Begelfer et al. | 428/40 |

Primary Examiner—George F. Lesmes
Assistant Examiner—D. R. Zirker
Attorney, Agent, or Firm—Frederic E. Naragon

[57] ABSTRACT

A label with a polypropylene core is provided with an extruded skin of polypropylene bonded to each face of the core, and opaquing agent layer bonded to one extruded polypropylene skin to provide opacity to block out preprinted graphics or printing on the object to which the label is secured, pressure sensitive aqueous acrylic polymer emulsion adhesive bonded to the opaquing agent layer for securing the label to any object, and printing or graphics bonded to the face of the other extruded polypropylene skin, and a clear polypropylene skin with pressure sensitive aqueous acrylic polymer emulsion adhesive bonded to the graphics or printing to protect the graphics or printing. In application the label is secured to metal, glass, plastic, or fiber containers with preprinted graphics or printing and if delaminated a portion of the label is removeable leaving an adhesive layer, an opaquing agent layer and one skin of polypropylene remaining to provide opacity of block out the original graphics or printing on the object. The preprinted container is thus salvagable and may be relabeled.

8 Claims, 1 Drawing Sheet

SECURITY AEROWRAP

BACKGROUND OF THE INVENTION

This invention pertains to a roll label primarily for use with metal, glass, plastic or fiber containers and primarily for salvaging preprinted containers. The prior art discloses patents for labels and some of the patents as listed are as follows:

U.S. Pat. No. 3,631,617—Pekko, Jan. 4, 1972
U.S. Pat. No. 4,121,003—Williams, Oct. 17, 1978
U.S. Pat. No. 4,184,701—Franklin, et al., Jan. 22, 1980

In the U.S. Pat. No. 3,631,617 issued to Pekko, Jan. 4, 1972, the label and its claims pertain to a tamper proof pressure sensitive label. Any attempt to remove the label leaves an adhesive and other indications of tampering but the invention does not provide for block out features and does not provide for an opaquing agent. The present invention is not a pressure sensitive label. The present invention is designed to reclaim obsolete inventory and upon delamination provides and leaves an opaquing agent layer providing for block out of preprinted graphics on the item to which the label is secured.

In the U.S. Pat. No. 4,121,003 to Williams, Oct. 17, 1978, the label and its claims pertain to a switch proof pressure sensitive label which upon delamination does not provide opacity and the invention is primarily designed to evidence tampering with the label for security purposes. The present invention is not a pressure sensitive label and upon delamination provides for leaving an opaquing agent layer and provides opacity and is designed to reclaim obsolete inventory and provide for relabeling of the same.

In the U.S. Pat. No. 4,184,701 issued to Franklin, et al., Jan. 22, 1980, the label and its claims comprise a label which is primarily useful for detecting tampering and is useful only to indicate tampering if their is an attempt to transfer the label from one object to another. No block out features are claimed or provided in this invention. The present invention provides block out of preprinted graphics upon delamination and leaves an opaquing agent layer which the patent issued to Franklin, et al., does not provide.

The present invention is further destinguished from the prior art in that the present invention discloses a label wherein the base construction of the present invention is a polypropylene core to which one extruded skin of polypropylene is added to each face of the core. Such a construction is well known in the art. An opaquing agent layer is added to one extruded polypropylene skin to provide opacity and block out preprinted graphics on the object to which it is secured. In the final construction, printing, adhesive and a clear skin of polypropylene are added to the non-opaque extruded polypropylene skin.

In application, the construction so described is bonded by an overall adhesive applied to the opaquing agent layer by labeling equipment already known in the field. If the label is removed from the container, the bottom adhesive layer, opaquing agent layer and one skin of polypropylene remain on the container thus covering or blocking out any previous printing on said container.

The present invention thus, discloses a label containing printing primarily to be adhered to metal, glass or plastic containers which have already been printed and are now obsolete due to graphics changes. Containers can thus be salvaged if the initial label is misprinted, needs updated with new or additional information, or if the container is to be used for an entirely different product than originally labeled. Application of this label renders an obsolete preprinted container resuable, thereby salvaging the investment already made, as the delamination of the present label leaves an opaquing agent layer providing opacity which continues to block out the obsolete graphics. In the container industry, containers can be salvaged and reused with new labels which, if removed, will not reveal the graphics from the old printing.

This concept is not disclosed in any of the prior art and the label and application constitute a new and novel label in the industry.

SUMMARY OF THE INVENTION

The present invention relates to a Security Aerowrap label which overcomes the foregoing prior art and other drawbacks and provides a novel and an improved roll label containing printed graphics which can be bonded primarily to any metal, glass, plastic, or fiber containers, and if layers are removed at a later time leaves a bottom adhesive layer, an opaquing agent layer proving opacity and one skin of polypropylene which thus covers or blocks out the preprinted graphics or printed materials and renders the container suitable for relabeling with new or additional material or graphics. If the new label is removed by the consumer no graphics or printing is exposed from the initial label to identify the container with previously labeled goods, products or related items. Such containers can thus be labeled and later relabeled with a new or updated label when if removed, will not reveal the information from the initial label. In addition such containers can be salvaged if the initial label is misprinted or becomes obsolete or the container is to be used for an entirely different product than originally labeled. Containers may be salvaged if labels are misprinted and labels can be changed on obsolete inventory. New labels can be added in the event that new material is required on the label such as net weight, ingredients, ownership, warnings, and contents.

In accordance with the present invention, a Security Aerowrap label is provided primarily in the application thereof to metal, glass, plastic or fiber containers wherein the base construction of the label is a polypropylene core with one extruded skin of polypropylene bonded on each face of the core and an opaquing agent layer is bonded to one extruded polypropylene skin to provide opacity to block out printing and other graphics on objects to which the label is secured and printing or graphics is added to the other extruded polypropylene skin with a final protective skin of clear propylene with adhesive bonded to the printed or graphic skin. The printing or graphics are an information containing pattern of letters, numbers, words, designs, or other forms of human or machine readable information and the method of printing is not novel. The application of the present invention provides that the label is bonded primarily to any glass, plastic or fiber preprinted container. A portion of the label if removed by the consumer leaves a bottom adhesive layer, an opaquing agent layer and one skin of polypropylene on the container, thus covering or blocking out any preprinted graphics or preprinted items originally appearing on the object. Such containers can be salvaged if the initial label is misprinted or it is necessary to amend or change information on the initial label such as net weight, ingredients, ownership, warnings or contents, or if the containers is to be used to package an entirely different product than anticipated by the initial label.

The polypropylene core and the two extruded skins of polypropylene are not novel and may be of Hercules ® 315 wt. 503/2B type.

The opaquing agent layer may be any metalization, but primarily aluminum applied by vacuum metalization, or any application of an opaque coating such as an opaque ink solution or the lamination of an opaque layer such as an opaque film.

DETAILED DESCRIPTION OF THE DRAWINGS

Figure 1:
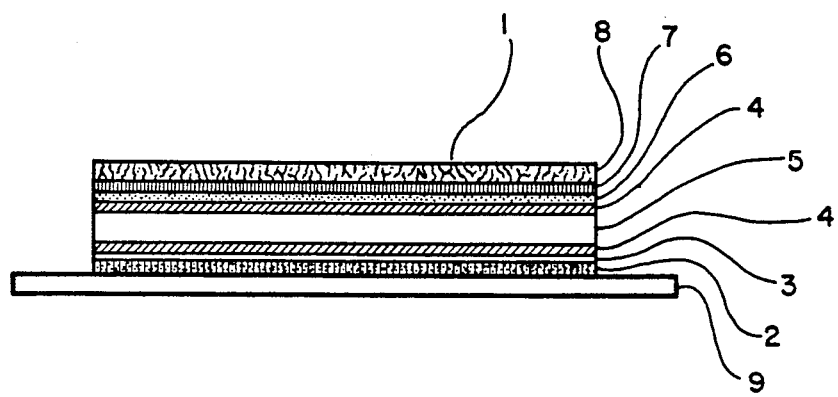
FIG. 1 is a schematic representation of the Security Aerowrap label with all component parts in place.

Reference is now made to the drawings wherein the present invention is illustrated in detail and wherein similar components bear the same reference numeral throughout the several views.

FIG. 1 illustrates the preferred embodiment of a schematic representation of the Security Aerowrap label, the entire invention generally referred to by numeral 1. A base construction is illustrated comprising a polypropylene core 5 to which one extruded skin of polypropylene 4 is bonded to each face of the polypropylene core 5 an opaquing agent layer 3 is bonded to one extruded polypropylene skin 4 to provide opacity to block out graphics and printing on the object 9 to which the label is adhered and printing or graphics 6 is bonded to the other extruded polypropylene skin 4 and a clear polypropylene protective skin 8 with adhesive 7 is bonded to the printing or graphics 6 to protect the printing or graphics 6. A securing adhesive 2 is bonded to the opaquing agent layer 3 to provide a securing means for securing the label to the object 9.

Figure 2:
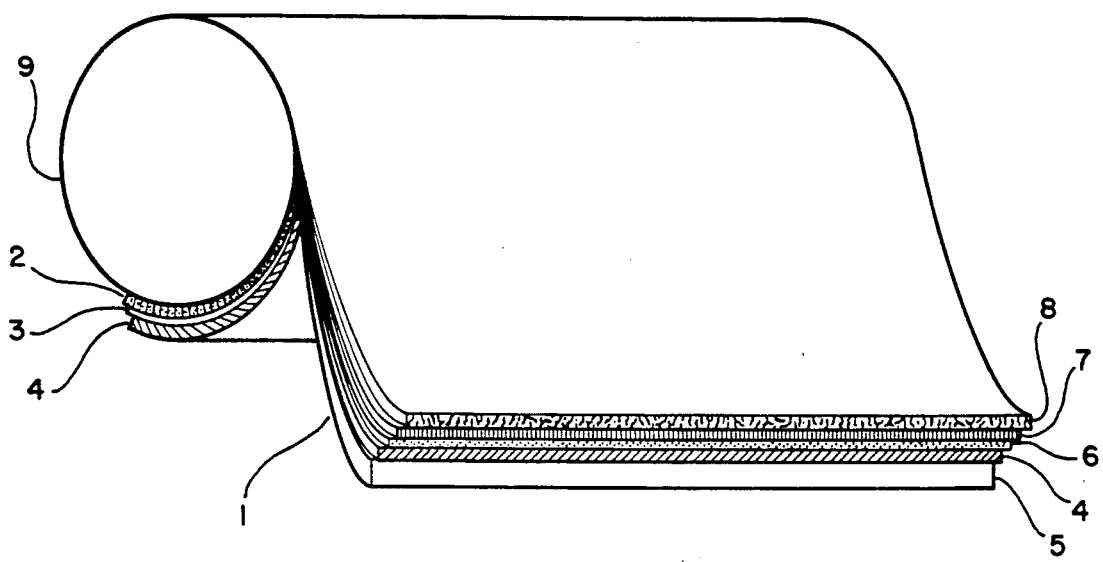
FIG. 2 is a representation of the Security Aerowrap label, upon an object, in a state of partial delamination.

FIG. 2 illustrates a representation of the preferred embodiment of the Security Aerowrap label upon an object 9 in a state of partial delamination, the entire invention generally referred to by numeral 1. A base construction is illustrated comprising a polypropylene core 5 to which one extruded skin of polypropylene 4 is bonded to each face of the polypropylene core 5 an opaquing agent layer 3 is bonded to one extruded polypropylene skin 4 to provide opacity to block out graphics and printing on the object 9 to which the label is secured and printing or graphics 6 is bonded to the other extruded polypropylene skin and a clear polypropylene protective skin 8 with adhesive 7 is bonded to the printing or graphics 6 to protect the printing or graphics 6. A securing adhesive 2 is bonded to the opaquing agent layer 3 to provide a securing means for securing the label to the object 9.

DESCRIPTION OF THE PREFERRED EMBODIMENT

Referring to FIGS. 1 and 2, the preferred embodiment of the present invention is a Security Aerowrap label generally referred to a numeral 1 with a base construction comprising a polypropylene core 5 to which one extruded skin of polypropylene 4 is bonded to each face of the polypropylene core 5 which construction is preferably of the Hercules ® 315 wt 503/2B type. An opaquing agent layer preferably vacuum metalization of aluminum is bonded to one extruded polypropylene skin 4 to provide opacity to block out graphics and printing on the object 9 to which the label is adhered and printing or graphics 6 in an information containing pattern is bonded to the other extruded polypropylene skin 4 and a clear polypropylene protective skin 8 preferably 0.0005 mm. with adhesive 7 is bonded to the printing or graphics 6 to protect the printing or graphics 6. A securing adhesive 2 is bonded to the opaquing agent layer 3 to provide a securing means for securing the label to the object 9.

Although the invention has been described in preferred form with a certain degree of particularity, it is understood that the present disclosure of the preferred form has been made only by way of example and numerous changes in the details of construction and the combination arrangement of parts may be resorted to without departing from the spirit and the scope of the invention as hereinafter claimed.

What is claimed is:

1. A label comprising:
a base construction comprising a polypropylene core to which one extruded skin of polypropylene is bonded to each face of the polypropylene core, an opaquing agent layer is bonded to one polypropylene skin to provide opacity to block out preprinted graphics and printing in an information containing pattern on any object to which the label is secured, printing or graphics in an information containing pattern is bonded to the other polypropylene skin, adhesive is bonded to the printing or graphics, a clear polypropylene skin is bonded to the printing or graphics by said adhesive to protect the printing or graphics, and a adhesive is bonded to the opaquing agent layer to provide a securing means for adhering the label to any object, and wherein the affinity of the said adhesive, said opaquing agent layer, and said extruded polypropylene skin layers of the label in closest proximity to the object to which the label is secured is greater than the affinity of the said remaining layers of the label.

2. The label of claim 1 wherein the opaquing agent layer is a metal layer.

3. The label of claim 1 wherein the opaquing agent layer is an opaque coating.

4. The label of claim 1 wherein the opaquing agent layer is an opaque lamination.

5. A method of salvaging an object with preprinted graphics and printing which comprises:
(a) securing a label to any object bearing preprinted graphics or printing in an information containing pattern wherein the base construction of the label comprises a polypropylene core to which one extruded skin of polypropylene is bonded to each face of the polypropylene core, an opaquing agent layer is bonded to one polypropylene skin to provide opacity to block out preprinted graphics and printing in an information containing pattern on any object to which the label is secured, printing and graphics in an information containing pattern is bonded to the other polypropylene skin, adhesive is bonded to the printing or graphics, a clear polypropylene skin is bonded to the printing or graphics by said adhesive to protect the printing or graphics, and a adhesive is bonded to the opaquing agent layers to provide a securing means for securing the label to any object, and wherein the affinity of the said adhesive, said opaquing agent layer, and said extruded polypropylene skin layers of the label in closest proximity to the object to which the label is secured is greater than the affinity of the said remaining layers of the label;

(b) upon delamination of the label the clear polypropylene protective skin, the graphics or printing, the said adhesive bonding the protective skin to the printing or graphics, one extruded polypropylene skin, and the polypropylene core layers of the label are removed leaving the said adhesive securing the label to the object, opaquing agent layer, and one extruded polypropylene skin layers of the label on the object and blocking out any preprinted graphics and printing initially contained on the object.

6. The method of salvaging an object with preprinted graphics and printing of claim 5 wherein the opaquing agent layer is a metal layer.

7. The method of salvaging an object with preprinted graphics and printing of claim 5 wherein the opaquing agent layer is an opaque coating.

8. The method of salvaging an object with preprinted graphics and printing of claim 5 wherein the opaquing agent layer is an opaque lamination.

* * * * *